(12) United States Patent
Shen

(10) Patent No.: US 11,592,714 B2
(45) Date of Patent: Feb. 28, 2023

(54) METHOD OF COATING POLYIMIDE FILM AND METHOD OF FABRICATING DISPLAY PANEL USING SAME

(71) Applicant: WUHAN CHINA STAR OPTOELECTRONICS SEMICONDUCTOR DISPLAY TECHNOLOGY CO., LTD., Hubei (CN)

(72) Inventor: Haiyang Shen, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 796 days.

(21) Appl. No.: 16/479,410

(22) PCT Filed: Apr. 16, 2019

(86) PCT No.: PCT/CN2019/082794
§ 371 (c)(1),
(2) Date: Jul. 19, 2019

(87) PCT Pub. No.: WO2020/164182
PCT Pub. Date: Aug. 20, 2020

(65) Prior Publication Data
US 2021/0333592 A1     Oct. 28, 2021

(30) Foreign Application Priority Data

Feb. 13, 2019 (CN) .......................... 201910113078.7

(51) Int. Cl.
C03C 17/42  (2006.01)
G02F 1/1337 (2006.01)
G02F 1/1333 (2006.01)

(52) U.S. Cl.
CPC .......... *G02F 1/13378* (2013.01); *C03C 17/42* (2013.01); *G02F 1/133302* (2021.01);
(Continued)

(58) Field of Classification Search
CPC ........... G02F 1/133302; G02F 1/13305; C03C 17/42; C03C 17/70; C03C 2218/112; C03C 2218/119
See application file for complete search history.

(56) References Cited

U.S. PATENT DOCUMENTS

| | | | |
|---|---|---|---|
| 8,697,485 B2* | 4/2014 | Crain | C09D 11/102 257/E21.299 |
| 2014/0057044 A1* | 2/2014 | Huang | C09D 179/08 427/66 |

(Continued)

FOREIGN PATENT DOCUMENTS

| | | |
|---|---|---|
| CN | 102888007 A | 1/2013 |
| CN | 104375229 A | 2/2015 |

(Continued)

OTHER PUBLICATIONS

Machine translation CN 104851521 (Year: 2015).*

*Primary Examiner* — Elizabeth A Burkhart
(74) *Attorney, Agent, or Firm* — PV IP PC; Wei Te Chung; Ude Lu

(57) ABSTRACT

A method of coating a polyimide film and a method of fabricating a display panel are provided by the embodiments of the present invention. The method of coating a polyimide film includes providing a glass substrate and at least one nozzle; forming a nanomaterial filled graphic letterpress on the glass substrate, wherein the nanomaterial filled graphic letterpress is formed with a plurality of protrusions; and
(Continued)

spraying a polyimide liquid on the nanomaterial filled graphic letterpress by the at least one nozzle to form a polyimide film.

18 Claims, 1 Drawing Sheet

(52) U.S. Cl.
CPC .... *G02F 1/133723* (2013.01); *C03C 2217/70* (2013.01); *C03C 2218/112* (2013.01); *C03C 2218/119* (2013.01); *G02F 2202/022* (2013.01); *G02F 2202/36* (2013.01)

(56) References Cited

U.S. PATENT DOCUMENTS

| | | | |
|---|---|---|---|
| 2015/0138041 A1* | 5/2015 | Hirakata | H01L 51/0097 345/1.3 |
| 2017/0309867 A1 | 10/2017 | Mun et al. | |
| 2019/0229282 A1 | 7/2019 | Zhang et al. | |

FOREIGN PATENT DOCUMENTS

| | | |
|---|---|---|
| CN | 104851521 A | 8/2015 |
| CN | 105082818 A | 11/2015 |
| CN | 107305756 A | 10/2017 |
| CN | 107968109 A | 4/2018 |
| CN | 109061950 A | 12/2018 |
| JP | 2013117637 A | 6/2013 |
| KR | 20150000697 A | 1/2015 |

* cited by examiner

METHOD OF COATING POLYIMIDE FILM AND METHOD OF FABRICATING DISPLAY PANEL USING SAME

FIELD OF INVENTION

The present invention relates to a field of semiconductor technologies, and in particular, to a polyimide coating method and a method of fabricating a display panel.

BACKGROUND OF INVENTION

Liquid crystal displays (LCDs) have many advantages, such as thin body, power saving, and no radiation, and have been widely used. Most of the liquid crystal display devices on the market are backlight type liquid crystal display devices, which include a liquid crystal display panel and a backlight module. The working principle of the liquid crystal display panel is to place liquid crystal molecules in two parallel glass substrates, the change direction of the liquid crystal molecules is controlled through whether the glass substrate is electrified or not, and light rays of the backlight module are refracted to generate images.

Generally, a liquid crystal display panel includes a color filter (CF) substrate, a thin film transistor (TFT) substrate, a liquid crystal (LC) sandwiched between the color filter substrate and the thin film transistor substrate, and a sealant frame (Sealant), a molding process thereof generally includes: front end (Array) process (i.e., thin film, photography, etching and peeling), middle section (Cell) process (i.e., bonding of the TFT substrate and the CF substrate) and rear end module assembly process (i.e., pressing of a driving IC and a printed circuit board). The front end (Array) process mainly forms the TFT substrate used to control the movement of liquid crystal molecules, the middle section (Cell) process mainly adds liquid crystal between the TFT substrate and the CF substrate, and the rear end module assembly process is mainly to bond the driving IC and to integrate with the print the circuit, in turn, drives the liquid crystal molecules to rotate and display images.

The liquid crystal display panel usually coats a polyimide film (Polyimide, PI) on the TFT substrate and the CF substrate, and forms a pretilt angle on the polyimide film by rubbing or photo etching to give a bearing angle for the liquid crystal molecules. Currently, the polyimide coating process mainly adopts the following method: wherein the polyimide liquid is evenly distributed on the relief plate (APR plate), and then the polyimide liquid is transferred to the TFT substrate or the CF substrate through the relief by a roller, and the TFT substrate or the CF substrate is moved in a plane at the same time to complete the coating of the polyimide.

Technical Problem

The current PI coating methods are uniform coating methods, and the PI thickness is the same everywhere in the effective area. The compression tension of such design in a static or in a dynamic bending process will have a serious impact on traces of the array substrate.

SUMMARY OF INVENTION

Technical Solution

The embodiment of the invention provides a method of coating a polyimide film and a method of fabricating a display panel, which reduces the usage of the compression tension of the polyimide film of the display panel in a static or in a dynamic bending process, thereby avoiding serious influence on traces of the array substrate and improving performance of fabricating the display panel.

In order to solve the above problems, in a first aspect, the present application provides a method of coating a polyimide film, the method including: providing a glass substrate and at least one nozzle; forming a nanomaterial filled graphic letterpress on the glass substrate using a preselected nanomaterial, wherein the nanomaterial filled graphic letterpress is formed with a plurality of protrusions; and spraying a polyimide liquid on the nanomaterial filled graphic letterpress by the at least one nozzle to form a polyimide film.

In some embodiments, a preselected nanomaterial is a nanomaterial with a preset transmittance.

In some embodiments, a preselected nanomaterial is nano-Ag or graphene.

In some embodiments, forming the nanomaterial filled graphic letterpress on the glass substrate using the preselected nanomaterial includes: fabricating a preset nanomaterial filled graphic letterpress using the preselected nanomaterial, and disposing the nanomaterial filled graphic letterpress on the glass substrate.

In some embodiments, a plurality of protrusions are evenly disposed on the nanomaterial filled graphic letterpress.

In some embodiments, a plurality of protrusions are disposed in a predetermined bending region on the nanomaterial filled graphic letterpress.

In some embodiments, a plurality of protrusions have a same structure.

In some embodiments, a plurality of protrusions each are a triangular protrusion.

In some embodiments, a plurality of protrusions each are a peak-shaped protrusion.

In some embodiments, while a number of the at least one nozzle is at least two, the at least two nozzles are closely arranged in a row, and a combined length of the at least two nozzles is equal to a width of the glass substrate.

In a second aspect, the application also provides a method of fabricating a display panel, the method including: providing a glass substrate and at least one nozzle; forming a nanomaterial filled graphic letterpress on the glass substrate using a preselected nanomaterial, wherein the nanomaterial filled graphic letterpress is formed with a plurality of protrusions; spraying a polyimide liquid on the nanomaterial filled graphic letterpress by the at least one nozzle to form a polyimide film; and peeling off the polyimide film from the nanomaterial filled graphic letterpress after completing the forming of the polyimide film.

In some embodiments, a preselected nanomaterial is a nanomaterial with a preset transmittance.

In some embodiments, a preselected nanomaterial is nano-Ag or graphene.

In some embodiments, forming the nanomaterial filled graphic letterpress on the glass substrate using the preselected nanomaterial includes: fabricating a preset nanomaterial filled graphic letterpress using a preselected nanomaterial, and disposing the nanomaterial filled graphic letterpress on the glass substrate.

In some embodiments, a plurality of protrusions are evenly disposed on the nanomaterial filled graphic letterpress.

In some embodiments, a plurality of protrusions are disposed in a predetermined bending region on the nanomaterial filled graphic letterpress.

In some embodiments, a plurality of protrusions have a same structure.

In some embodiments, a plurality of protrusions each are a triangular protrusion.

In some embodiments, a plurality of protrusions each are a peak-shaped protrusion.

In some embodiments, while a number of the at least one nozzle is at least two, the at least two nozzles are closely arranged in a row, and a combined length of the at least two nozzles is equal to a width of the glass substrate.

Beneficial Effect

A method of coating a polyimide film disclosed by the embodiments of the present invention, which utilizes by providing a glass substrate and at least one nozzle; forming a nanomaterial filled graphic letterpress on the glass substrate, wherein the nanomaterial filled graphic letterpress is formed with a plurality of protrusions; and spraying a polyimide liquid on the nanomaterial filled graphic letterpress by the at least one nozzle to form a polyimide film. In the embodiment of the present invention, since the nanomaterial filled graphic letterpress having a plurality of protrusions is formed, the formed polyimide film has corresponding protrusions. After the formation of subsequent processes of the display panel, since the polyimide film has corresponding protrusions, the usage of the compression tension of the polyimide film is reduced during the static or the dynamic bending process of the display panel, thereby avoiding serious influence on traces of the array substrate and improving performance of fabricating the display panel.

BRIEF DESCRIPTION OF FIGURES

In order to illustrate the technical solutions of the present invention or the related art in a clearer manner, the drawings desired for the present disclosure or the related art will be described hereinafter briefly. Obviously, the following drawings merely relate to some embodiments of the present invention, and based on these drawings, a person skilled in the art may obtain the other drawings without any creative effort.

DETAILED DESCRIPTION OF EMBODIMENTS

The following content combines with the drawings and the embodiment for describing the present invention in detail. It is obvious that the following embodiments are only some embodiments of the present invention. For the skilled persons of ordinary skill in the art without creative effort, the other embodiments obtained thereby are still covered by the present invention.

The following description of each embodiment, with reference to the accompanying drawings, is used to exemplify specific embodiments which may be carried out in the present invention. Directional terms mentioned in the present invention, such as "center", "longitudinal", "transverse", "length", "width", "thickness", "upper", "lower", "front", "rear", "left", "right", "vertical", "horizontal", "top", "bottom", "inside", "outside", and etc. are only used with reference to the orientation of the accompanying drawings. Therefore, the used directional terms are intended to illustrate, but not to limit, the present invention. Moreover, the terms "first" and "second" are used for descriptive purposes only and are not to be construed as indicating or implying a relative importance or implicitly indicating the number of technical features indicated. Thus, features defining "first" or "second" may include one or more of the described features either explicitly or implicitly. In the description of the present invention, the meaning of "a plurality" is two or more unless specifically and specifically defined otherwise.

In the embodiment of the present invention, a method of coating a polyimide film and a method of fabricating a display panel are provided, which are respectively described in detail below.

Firstly, an embodiment of the present invention provides a method of coating a polyimide film, the method including: providing a glass substrate and at least one nozzle; forming a nanomaterial filled graphic letterpress on the glass substrate, wherein the nanomaterial filled graphic letterpress is formed with a plurality of protrusions; and spraying the polyimide liquid on the nanomaterial filled graphic letterpress by the at least one nozzle to form a polyimide film.

Figure 1:
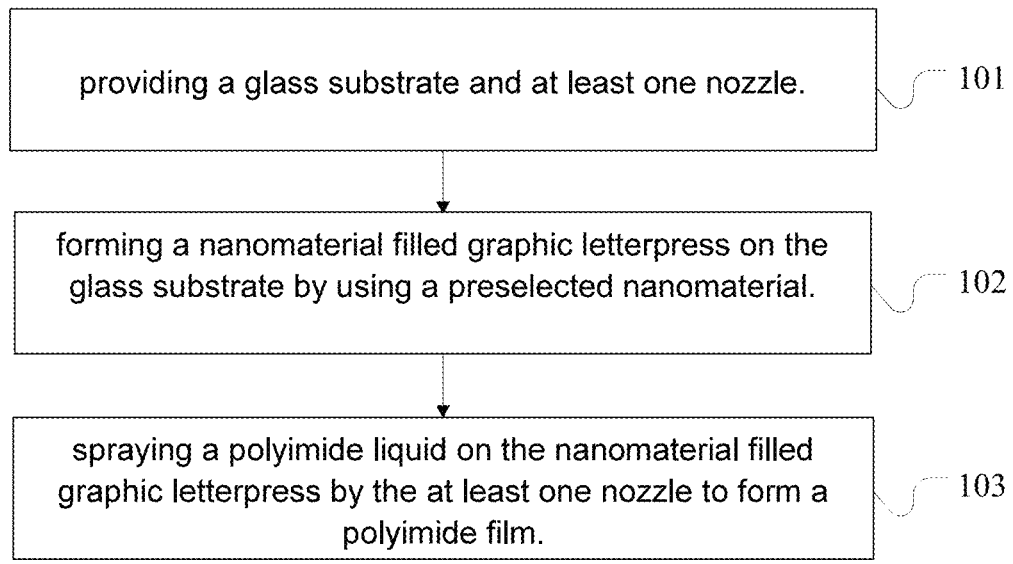
FIG. 1 is a schematic flow chart of a method of coating a polyimide film according to an embodiment of the present invention.

As shown in FIG. 1, it is a schematic flow chart of a method of coating a polyimide film according to an embodiment of the present invention, the method including:

101, providing a glass substrate and at least one nozzle.

In an embodiment of the invention, the glass substrate can be a rigid carrier substrate.

The number of nozzles in this step can be one or more. When the number of the at least one nozzle is at least two, the at least two nozzles can be closely arranged in a row. Preferably, a combined length of the at least two nozzles is equal to a width of the glass substrate. In this step, by a setting which a combined length of the at least two nozzles is equal to the width of the glass substrate, so that the polyimide liquid can be completely dripped on the glass substrate, whereby the waste caused by incomplete coating or dropping on the outside of the glass substrate is avoided. In this step, at least two nozzles are vertically suspended above the glass substrate, and the outer edges of the entire row of nozzles are aligned with the outer edges of the glass substrate to avoid the waste caused by incomplete coating or dripping on the glass substrate.

In addition, in the embodiment of the present invention, the at least one nozzle can adopt a round pipe type nozzle or other nozzle of a suitable specification, which is not limited herein.

102, forming a nanomaterial filled graphic letterpress on the glass substrate using a preselected nanomaterial.

Meanwhile, the nanomaterial filled graphic letterpress is formed with a plurality of protrusions. Specifically, there are many ways to set the protrusions on the nanomaterial filled graphic letterpress. In some embodiments of the present invention, the plurality of protrusions are evenly disposed on the nanomaterial filled graphic letterpress (in this case, the predetermined bending region can include at least one of the plurality of protrusions). In some other embodiments of the present invention, the plurality of protrusions can be set only on a predetermined bending region on the nanomaterial filled graphic letterpress, and the predetermined bending region can be pre-designed and confirmed. It can be understood that a setting of the plurality of protrusions on the nanomaterial filled graphic letterpress can also be set in other ways, for example, the nanomaterial filled graphic letterpress unevenly sets the plurality of protrusions thereon, and the nanomaterial filled graphic letterpress has the protrusions set on both sides thereof (as a first situation shown in FIG. 2) and so on. The setting of the plurality of protrusions on the nanomaterial filled graphic letterpress can ensure that the usage of the compression tension of the polyimide film can be reduced during the static or the dynamic bending process of the display panel, and is not specifically limited herein.

Figure 2:
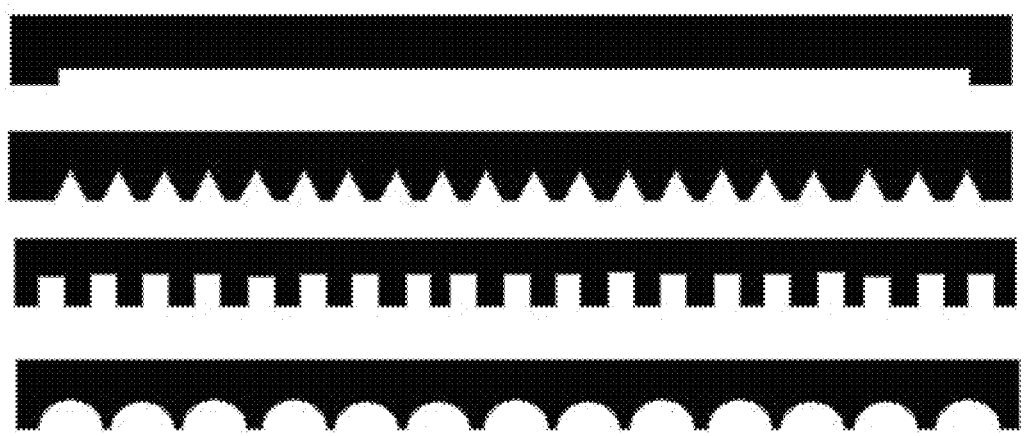
FIG. 2 is a schematic structural view of a plurality of protrusions on a nanomaterial filled graphic letterpress according to an embodiment of the present invention.

In some embodiments of the invention, the plurality of protrusions have a same structure. As shown in FIG. 2, the plurality of protrusions each can be a triangular protrusion, or a peak-shaped protrusion, or a rectangular protrusion. It is to be understood that in some other embodiments of the present invention, the plurality of protrusions each can be different structure, for example, a part of triangular protrusions, a part of a peak-shaped protrusions, a part of a rectangular protrusions, and a structure of the plurality of protrusions is not limited in the embodiments of the invention.

Light transmittance is a physical vocabulary that indicates the ability of light to pass through a medium, the percentage of a light flux through a transparent or translucent body and its incident light flux. The light transmittance can represent the efficiency of transmitted light of a display device or the like, which directly affects the visual effect of the display device.

In order to ensure the light transmittance of the subsequently fabricated display panel, further, the preselected nanomaterial in the embodiment of the present invention can be a nanomaterial that achieves preset transmittance. In order to ensure that the fabricated display panel is peeled off from the nanomaterial, the preselected nanomaterial is a nanomaterial that is easily peeled off after being combined with the polyimide film. Specifically, the preselected nanomaterial can be nano-Ag or graphene. Since graphene is currently costly and technically demanding, it is preferred that the preselected nanomaterial can be nano-Ag.

In some embodiments of the present invention, forming the nanomaterial filled graphic letterpress on the glass substrate using the preselected nanomaterial includes: fabricating a preset nanomaterial filled graphic letterpress using the preselected nanomaterial, and disposing the nanomaterial filled graphic letterpress on the glass substrate. Specifically, the preset nanomaterial filled graphic letterpress can be produced by a letterpress printing method.

103, spraying a polyimide liquid on the nanomaterial filled graphic letterpress by the at least one nozzle to form a polyimide film.

In some embodiments of the present invention, each of the at least one nozzle can have the same flow rate, the flow rate being set according to a thickness of a polyimide film to be coated on the glass substrate, the at least one nozzle being turned on or off simultaneously to ensure the uniformity of the coating of the polyimide liquid.

In the embodiment of the present invention, after forming a polyimide film, a flexible substrate can be formed on the polyimide film, and display elements (including a pixel array and an organic light emitting structure) and an encapsulation layer can be prepared on the flexible substrate. Thereafter, the flexible substrate with the prepared display elements and the rigid carrier substrate are peeled off by a mechanical peeling or laser irradiation peeling method to obtain a display panel.

A method of coating a polyimide film disclosed by the embodiments of the present invention, which utilizes by providing a glass substrate and at least one nozzle; forming a nanomaterial filled graphic letterpress on the glass substrate, wherein the nanomaterial filled graphic letterpress is formed with a plurality of protrusions; and spraying a polyimide liquid on the nanomaterial filled graphic letterpress by the at least one nozzle to form a polyimide film. In the embodiment of the present invention, since the nanomaterial filled graphic letterpress having a plurality of protrusions is formed, the formed polyimide film has corresponding protrusions. After the formation of subsequent processes of the display panel, since the polyimide film has corresponding protrusions, the usage of the compression tension of the polyimide film is reduced during the static or the dynamic bending process of the display panel, thereby avoiding serious influence on traces of the array substrate and improving performance of fabricating the display panel.

In order to better implement of the method of coating a polyimide film in the embodiment of the present invention, on the basis of the method of coating a polyimide film, the embodiment of the present invention further provides a method of fabricating a display panel, as described in any step of aforementioned method of coating a polyimide film in the embodiment, and the step of peeling off the polyimide film from the nanomaterial filled graphic letterpress after completing the forming of the polyimide film.

Meanwhile, a laser peeling technique or a mechanical peeling technique can be utilized by peeling off the polyimide film from the nanomaterial filled graphic letterpress, and it is preferable to use a laser peeling technique.

The performance of the display panel fabricated by the method of fabricating a display panel is further improved by employing the method of coating a polyimide film as described in the above embodiment.

In the above embodiments, the description of each embodiment has an emphasis, some of the sections that are not detailed in an embodiment can be referred to the detailed description of other embodiments, and the description thereof will not be described in detail herein.

In specific implementation, each of the above units or structures can be implemented as a separate entity, or can be combined in any combination, as one or several entities. For the specific implementation of the above various units or structures, refer to the aforementioned method embodiments, and details are not described herein again.

The method of coating a polyimide film and the method of fabricating a display panel provided by the embodiments of the present invention are described in details above. The principles and implementations of the present invention are described herein with specific examples. The description of the above embodiments is only for helping to understand the method of the present invention and its core ideas; at the same time, a person skilled in the art can make various modifications and changes to the above embodiments without departing from the technical idea of the present invention, and such variations and modifications are intended to be within the scope of the invention.

What is claimed is:
1. A method of coating a polyimide film, the method comprising:
  providing a glass substrate and at least one nozzle;
  forming a nanomaterial filled graphic letterpress on the glass substrate using a preselected nanomaterial, wherein the nanomaterial filled graphic letterpress is formed with a plurality of protrusions; and
  spraying a polyimide liquid on the nanomaterial filled graphic letterpress by the at least one nozzle to form a polyimide film;

wherein the protrusions are evenly disposed on the nanomaterial filled graphic letterpress.

2. The method of coating a polyimide film as claimed in claim 1, wherein the preselected nanomaterial is a nanomaterial with a preset transmittance.

3. The method of coating a polyimide film as claimed in claim 1, wherein the preselected nanomaterial is nano-Ag or graphene.

4. The method of coating a polyimide film as claimed in claim 1, wherein forming the nanomaterial filled graphic letterpress on the glass substrate using the preselected nanomaterial comprises:
fabricating a preset nanomaterial filled graphic letterpress using the preselected nanomaterial, and disposing the nanomaterial filled graphic letterpress on the glass substrate.

5. The method of coating a polyimide film as claimed in claim 1, wherein the plurality of protrusions are disposed in a predetermined bending region on the nanomaterial filled graphic letterpress.

6. The method of coating a polyimide film as claimed in claim 1, wherein the plurality of protrusions have a same structure.

7. The method of coating a polyimide film as claimed in claim 6, wherein the plurality of protrusions each are a triangular protrusion.

8. The method of coating a polyimide film as claimed in claim 6, wherein the plurality of protrusions each are a peak-shaped protrusion.

9. The method of coating a polyimide film as claimed in claim 1, wherein the number of the at least one nozzle is at least two, the at least two nozzles are closely arranged in a row, and a combined length of the at least two nozzles is equal to a width of the glass substrate.

10. A method of fabricating a display panel, the method comprising:
providing a glass substrate and at least one nozzle;
forming a nanomaterial filled graphic letterpress on the glass substrate using a preselected nanomaterial, wherein the nanomaterial filled graphic letterpress is formed with a plurality of protrusions;
spraying a polyimide liquid on the nanomaterial filled graphic letterpress by the at least one nozzle to form a polyimide film; and
peeling off the polyimide film from the nanomaterial filled graphic letterpress after completing the forming of the polyimide film;
wherein the protrusions are evenly disposed on the nanomaterial filled graphic letterpress.

11. The method of fabricating a display panel as claimed in claim 10, wherein the preselected nanomaterial is a nanomaterial with a preset transmittance.

12. The method of fabricating a display panel as claimed in claim 11, wherein the preselected nanomaterial is nano-Ag or graphene.

13. The method of fabricating a display panel as claimed in claim 10, wherein forming the nanomaterial filled graphic letterpress on the glass substrate using the preselected nanomaterial comprises:
fabricating a preset nanomaterial filled graphic letterpress using a preselected nanomaterial, and disposing the nanomaterial filled graphic letterpress on the glass substrate.

14. The method of fabricating a display panel as claimed in claim 10, wherein the plurality of protrusions are disposed in a predetermined bending region on the nanomaterial filled graphic letterpress.

15. The method of fabricating a display panel as claimed in claim 10, wherein the plurality of protrusions have a same structure.

16. The method of fabricating a display panel as claimed in claim 15, wherein the plurality of protrusions each are a triangular protrusion.

17. The method of fabricating a display panel as claimed in claim 15, wherein the plurality of protrusions each are a peak-shaped protrusion.

18. The method of fabricating a display panel as claimed in claim 10, wherein the number of the at least one nozzle is at least two, the at least two nozzles are closely arranged in a row, and a combined length of the at least two nozzles is equal to a width of the glass substrate.

* * * * *